US005765936A

United States Patent [19]
Walton et al.

[11] Patent Number: 5,765,936
[45] Date of Patent: Jun. 16, 1998

[54] PORTABLE NEON LIGHTING SYSTEM

[76] Inventors: Judy T. Walton; Clark Todd Driver, both of 8622 Maple Ridge La., Montgomery, Ala. 36116

[21] Appl. No.: 707,231

[22] Filed: Sep. 3, 1996

[51] Int. Cl.[6] .................................................. B62J 6/00
[52] U.S. Cl. .......................... 362/72; 362/183; 362/191; 362/225; 362/234
[58] Field of Search .......................... 362/72, 78, 183, 362/190–193, 234, 61, 80, 225; 340/432

[56] References Cited

U.S. PATENT DOCUMENTS

| D. 317,055 | 5/1991 | Moore | D26/35 |
|---|---|---|---|
| D. 326,630 | 6/1992 | Tan | D12/111 |
| 3,863,205 | 1/1975 | Chun-Chih | 340/438 |
| 4,088,882 | 5/1978 | Lewis | 362/192 |
| 4,325,108 | 4/1982 | Spingler | 362/183 |
| 4,598,339 | 7/1986 | Ainsworth | 362/72 |
| 4,875,142 | 10/1989 | Spector | 362/72 |
| 4,901,209 | 2/1990 | Nitz | 362/72 |
| 5,008,782 | 4/1991 | Murray | 362/72 |
| 5,283,547 | 2/1994 | Leon | 362/72 |
| 5,418,697 | 5/1995 | Chiou | 362/72 |
| 5,436,814 | 7/1995 | Hanley | 362/216 |
| 5,442,526 | 8/1995 | Stowe, Jr. | 362/61 |
| 5,479,324 | 12/1995 | Barry | 362/72 |

Primary Examiner—Alan Cariaso

[57] ABSTRACT

The present invention relates to a portable neon lighting system (10) connectable to a vehicle. The portable neon lighting system (10) comprises a first plastic encased neon light (12A) which comprises a first plastic encased neon light electrical connection (12AA), at least one first plastic encased neon light first strap (12ABA), and at least one first plastic encased neon light second strap (12ABB). The portable neon lighting system (10) further comprises a rechargeable battery/transformer (14) electrically connected to the first plastic encased neon light electrical connection (12AA). The rechargeable battery/transformer (14) comprises a rechargeable battery/transformer ON/OFF switch (14A) electrically connected between the battery and the transformer, the rechargeable battery/transformer (14) is connectable to a frame member by a rechargeable battery/transformer first strap (14BA) and a rechargeable battery/transformer second strap (14BB). The portable neon lighting system (10) further comprises a recharger (16) electrically connected to the rechargeable battery/transformer (14) by a recharger electrical connection (16A). The recharger (16) is connectable to a frame member by a recharger first strap (16BA) and a recharger second strap (16BB). The recharger (16) further comprises a recharger engager (16C) which functions to engage to and rotate with a moving part of the vehicle. The recharger engager (16C) functions as an energy transformation means to power the rechargeable battery/transformer (14) thereby generating electricity therefrom.

2 Claims, 3 Drawing Sheets 5,765,936

PORTABLE NEON LIGHTING SYSTEM

BACKGROUND OF THE INVENTION

1. Field of the Invention

The present invention relates to portable neon lighting. More particularly, the present invention relates to portable neon lighting that is attachable to a bicycle, boat, skateboard and other vehicles as well as sorting equipment.

2. Description of the Prior Art:

It is well known in the art that vehicle accessories as well as equipment having illumination are limited in their use, hard to install and are not retrofittable to pre-existing equipment. Neon lights have been incorporated into bicycle frames and handle bars as well as turn signal bars. However, there exists a need for a simple to install retrofittable illumination system for vehicles which utilizes a rechargeable battery and recharging apparatus.

Numerous innovations for a portable neon lighting system have been provided in the prior art that are described as follows. Even though these innovations may be suitable for the specific individual purposes to which they address, they differ from the present invention as hereinafter contrasted.

In U.S. Pat. No. 5,479,324, titled Illuminated gas tank or shell, invented by James E. Barry, disclosed is a double-walled gasoline or fluid tank having a hollow space allowing light to be visible externally through a variety of openings or designs. A concave side portion of an existing tank is removed and a flat side wall, having an illumination device attached thereto, is attached where the original side portion was removed to create a new tank. An opening is created on the original side portion and the original side portion is reattached to the tank. The illumination device provides light through the opening in the original side portion.

In U.S. Pat. No. 5,418,697, titled Signal lamp assembly for bicycles, invented by Danny Chion, a signal lamp assembly including a casing fixed to the spokes of a bicycle wheel, two tubular, light permeable lampshades connected to two opposite ends of the casing, and a lamp circuit unit installed in the casing and the lampshades and consisting of a battery, a manual switch, a reversing switch, and a series of light emitting diodes disposed in the lampshades and controlled to give light by the manual switch and the reversing switch, wherein the reversing switch is alternatively switched on and off when the bicycle wheel is turned round and round after the manual switch is switched on, causing the light emitting diodes to flash.

In U.S. Pat. No. 5,008,782, titled Lighted Handlebar for Bicycles, invented by Wliiam D. Murray, a bicycle handlebar has numerous lamps disposed along its length. The handlebar may be transparent or partially transparent with the lamps embedded in the handlebar material. The lamps may be of different colors, and may be of the sort which flash individually. The effect is attractive and appealing to youngsters to encourage the use of the lighting system. The lamps may also be made replaceable; lamp sockets may be embedded in the handlebar material. The lamps are wired in parallel for reliability. The electric power for the lamps is supplied through jacks inserted into the handlebar near the point where the handlebar attaches to the stem of the bicycle.

In U.S. Pat. No. 4,901,209, titled Illuminated Bicycle Frame, invented by James C. Nitz, an illuminated bicycle having a body frame, a handlebar and wheels formed of hollow tubular members made of plastic material that allows light to be transmitted radially through their side walls. A high intensity lamp is mounted at a predetermined location within one of the hollow tubular members. A bundle of flexible elongated optical fibers have their one end positioned adjacent the high intensity lamp so that light therefrom would be transmitted through the optical fibers. The optical fibers are threaded through out the hollow tubular members of the bicycle body frame so that when the lamp is illuminated the hollow tubular members will glow and make them highly visible at night. The lamp may be powered by batteries or a small bicycle generator.

In U.S. Pat. No. 4,875,142, titled Bicycle Safety Lights, invented by Donald Spector, self-contained starboard and port light units that are receivable in the backswept hollow arms of a bicycle handlebar to provide blinking light signals that are highly visible to drivers of vehicles to the rear of the bicyclist. Each unit includes a tubular battery case adapted to wedge into a handlebar arm. The open front end of the case projects from the arm and has an edge contact thereon that is connected to the base pole of the battery whose center pole is exposed at the front end of the case. Coupled to the front end of the case is a rotatable beacon assembly formed by a lens and a cylindrical mounting therefor within which is a light bulb whose center terminal engages the center pole or the battery and whose base terminal is connected to a movable switch contact that only engages the edge contact on the case when the rotatable assembly is caused to assume a particular angular position. The light bulb incorporates a thermostatic interrupter to effect intermittent energization thereof.

In Patent number D326,630, titled Bicycle, invented by Hing Y. Tan, the ornamental design for a bicycle, is as shown.

In Patent number D317,055, titled Combined Spoke-mounted String of Bicycle Lights and Switch Therefor, invented by Terrence J. Moore, the ornamental design for a combined spoke-mounted string of bicycle lights and switch therefor, is as shown and described.

The above described patented inventions differ from the present invention because they lack one or more of the following features: plastic encased neon light, rechargeable battery/transformer, recharger, and specialized recharger engager which is adaptable to engagement with a tire as a friction wheel or air/water as a paddle wheel having fins protruding therefrom.

Numerous innovations for a portable neon lighting system have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to portable neon lighting. More particularly, the present invention relates to portable neon lighting that is attachable to a bicycle, boat, skateboard and other vehicles as well as sorting equipment.

The types of problems encountered in the prior art are vehicles are often hard to see at night and require illumination.

In the prior art, unsuccessful attempts to solve this problem were attempted namely: illuminated frames, handle bars and accessories for a vehicle. However, the problem was solved by the present invention because ir is easily installable and can retrofit any existing vehicle.

Innovations within the prior art are rapidly being exploited in the field of illumination.

3

The present invention went contrary to the teaching of the art which teaches illumination incorporated into structural members of a vehicle.

The present invention solved a long felt need for an improved vehicle illumination system.

The present invention produced unexpected results namely: by utilizing the portable neon lighting system accidents occurred less frequently.

A synergistic effect was produced utilizing the present invention due to the following facts and results from experimentation: due to the reduction of accidents for persons utilizing the portable neon lighting system, it is a possibility that insurance companies would reduce premiums for persons using the system.

Accordingly, it is an object of the present invention to provide a portable neon lighting system.

More particularly, it is an object of the present invention to provide a portable neon lighting system which comprises at least one plastic encased neon light.

In keeping with these objects, and with others which will become apparent hereinafter, one feature of the present invention resides, briefly stated, in the plastic encased neon light comprising a plastic encased neon light electrical connection connected to a rechargeable battery/transformer.

When the plastic encased neon light is designed in accordance with the present invention, it comprises a plastic encased neon light first strap and a plastic encased neon light second strap.

In accordance with another feature of the present invention, the rechargeable battery/transformer comprises a rechargeable battery/transformer ON/OFF switch positioned between the battery and the transformer.

Another feature of the present invention is that the rechargeable battery/transformer further comprises a rechargeable battery/transformer first strap and a rechargeable battery/transformer second strap for attachment to a structure.

Yet another feature of the present invention is that rechargeable battery/transformer is electrically connected to the recharger by a recharger electrical connection.

Still another feature of the present invention is that the recharger comprises recharger first strap and recharger second strap for attachment to a structure.

Yet still another feature of the present invention is that the recharger further comprises a recharger engager which can be adapted by configuration to engage different mediums such as a friction wheel to engage tires and wheels or a paddle wheel to engage water or air.

The novel features which are considered characteristic for the invention are set forth in the appended claims. The invention itself however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—portable neon lighting (10)
12A—first plastic encased neon light (12A)
12AA—first plastic encased neon light electrical connection (12AA)
12ABA—first plastic encased neon light first strap (12ABA)

4

12ABB—first plastic encased neon light second strap (12ABB)
12B—second plastic encased neon light (12B)
12BA—second plastic encased neon light electrical connection (12BA)
12BBA—second plastic encased neon light first strap (12BBA)
12BBB—second plastic encased neon light second strap (12BBB)
12C—third plastic encased neon light (12C)
12CA—third plastic encased neon light electrical connection (12CA)
12CBA—third plastic encased neon light first strap (12CBA)
12CBB—third plastic encased neon light second strap (12CBB)
12D—fourth plastic encased neon light (12D)
12DA—fourth plastic encased neon light electrical connection (12DA)
12DBA—fourth plastic encased neon light first strap (12DBA)
12DBB—fourth plastic encased neon light second strap (12DBB)
14—rechargeable battery/transformer (14)
14A—rechargeable battery/transformer ON/OFF switch (14A)
14BA—rechargeable battery/transformer first strap (14BA)
14BB—rechargeable battery/transformer second strap (14BB)
16—recharger (16)
16A—recharger electrical connection (16A)
16BA—recharger first strap (16BA)
16BB—recharger second strap (16BB)
16C—recharger engager (16C)
18—bicycle (18)
18A—bicycle horizontal cross member (18A)
18B—bicycle first vertical cross member (18B)
18C—bicycle second vertical cross member (18C)
18D—bicycle front fork (18D)
18E—bicycle rear fork (18E)
18F—bicycle tire (18F)

DESCRIPTION OF THE PREFERRED EMBODIMENT

Figure 1:
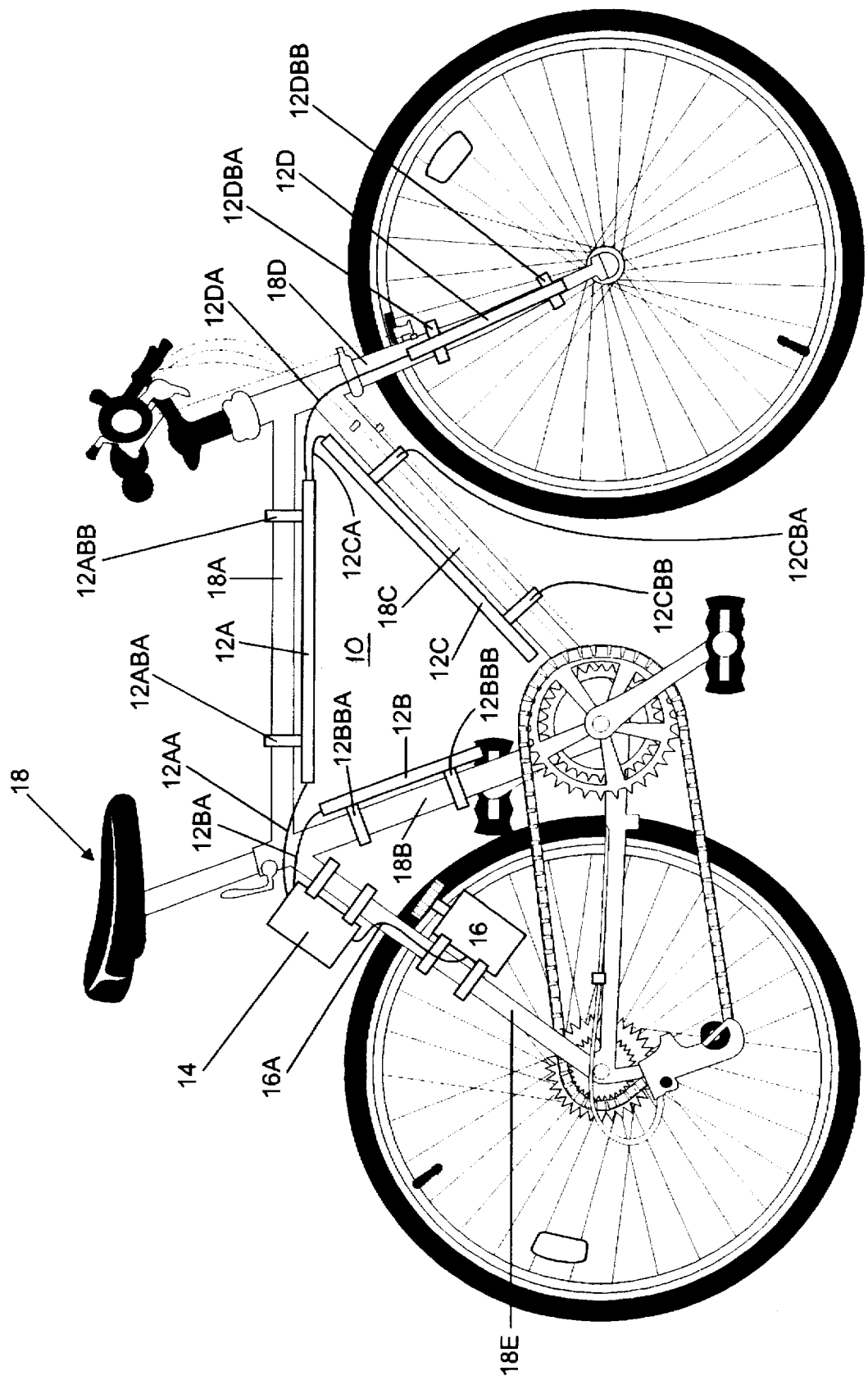
FIG. 1 is a right side view of a bicycle exhibiting a portable neon lighting system mounted thereon.

Firstly, referring to FIG. 1 which is a right side view of a bicycle (18) exhibiting a portable neon lighting system (10) mounted thereon. The portable neon lighting system (10) comprises a first plastic encased neon light (12A) which comprises a first plastic encased neon light electrical connection (12AA), a first plastic encased neon light first strap (12ABA), and a first plastic encased neon light second strap (12ABB). The portable neon lighting system (10) further comprises a rechargeable battery/transformer (14) electrically connected to the first plastic encased neon light electrical connection (12AA). The portable neon lighting system (10) further comprises a recharger (16) electrically connected to the rechargeable battery/transformer (14) by a recharger electrical connection (16A).

The bicycle (18) comprises a bicycle horizontal cross member (18A), a bicycle first vertical cross member (18B), a bicycle second vertical cross member (18C), a bicycle front fork (18D), and a bicycle rear fork (18E), the first plastic encased neon light (12A) is securely fastened to the bicycle horizontal cross member (18A) by the first plastic encased neon light first strap (12ABA) and the first plastic encased neon light second strap (12ABB). An optional second plastic encased neon light (12B) may be securely fastened to the bicycle first vertical cross member (18B) by a second plastic encased neon light first strap (12BBA) and a second plastic encased neon light second strap (12BBB). The second plastic encased neon light (12B) is electrically connected to the rechargeable battery/transformer (14) by a second plastic encased neon light electrical connection (12BA). Optionally, a third plastic encased neon light (12C) may be securely fastened to the bicycle second vertical cross member (18C) by a third plastic encased neon light first strap (12CBA) and a third plastic encased neon light third strap (12CBB). The third plastic encased neon light (12C) is electrically connected to the rechargeable battery/transformer (14) via the first plastic encased neon light (12A) by a third plastic encased neon light electrical connection (12CA). Optionally, a fourth plastic encased neon light (12D) securely fastened to the bicycle front fork (18D) by a fourth plastic encased neon light first strap (12DBA) and a fourth plastic encased neon light fourth strap (12DBB). The fourth plastic encased neon light (12D) is electrically connected to the rechargeable battery/transformer (14) via the first plastic encased neon light (12A) by a fourth plastic encased neon light electrical connection (12DA).

Figure 2:
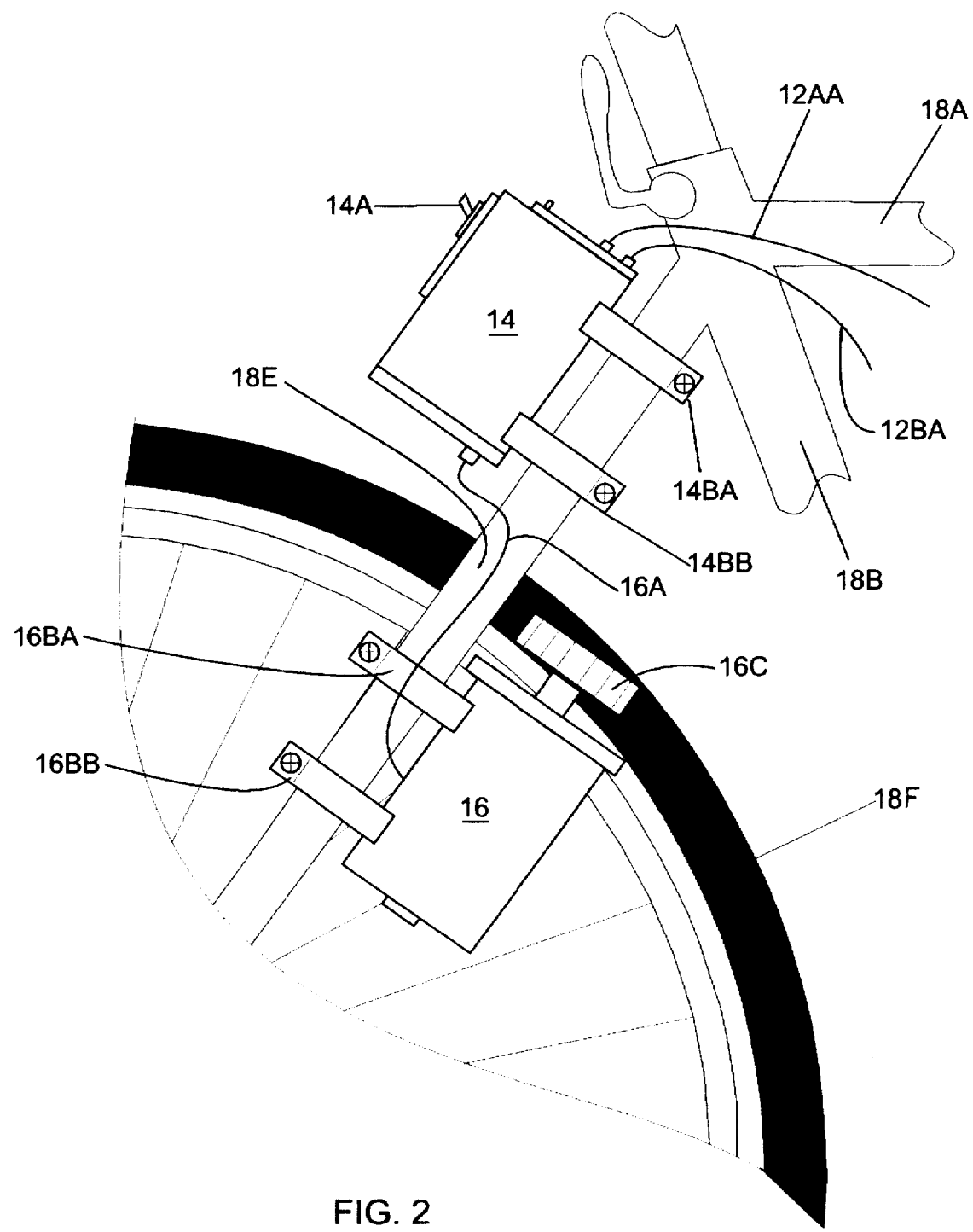
FIG. 2 is an enlarged right side view of a bicycle exhibiting a rechargeable battery/transformer and a recharger of the portable neon lighting system mounted thereon.

Now referring to FIG. 2 which is an enlarged right side view of a bicycle (18) exhibiting a rechargeable battery/transformer (14) and a recharger (16). The rechargeable battery/transformer (14) comprises a rechargeable battery/transformer ON/OFF switch (14A) electrically connected between the battery and the transformer. The rechargeable battery/transformer (14) is connected to a frame member by a rechargeable battery/transformer first strap (14BA) and a rechargeable battery/transformer second strap (14BB). The recharger (16) is connectable to a frame member by a recharger first strap (16BA) and a recharger second strap (16BB). The recharger (16) further comprises a recharger engager (16C) which functions to engage to and rotate with a moving part of the vehicle. The recharger engager (16C) functions as an energy transformation means to power the rechargeable battery/transformer (14) thereby generating electricity therefrom. If the vehicle is a bicycle (18), the recharger engager (16C) is a friction wheel which engages a bicycle tire (18F).

Figure 3A:
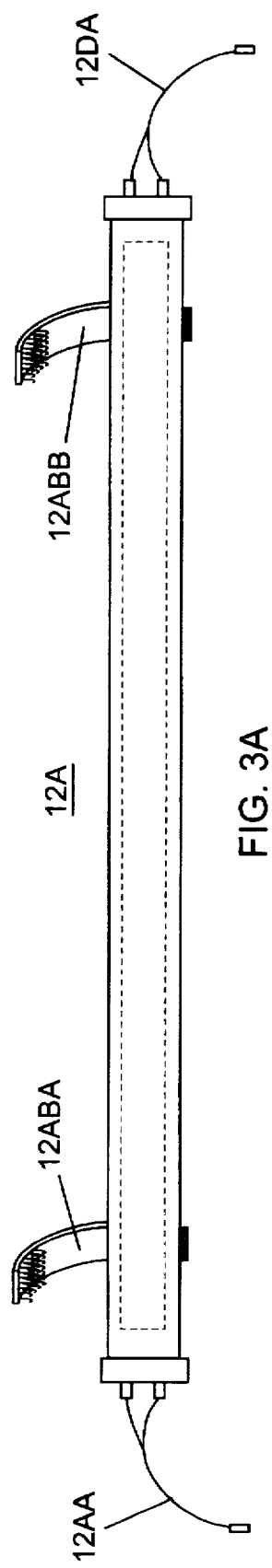
FIG. 3A is a side view of a first plastic encased neon light.

Referring to FIG. 3A which is a side view of a first plastic encased neon light, having a first plastic encased neon light (12A) which comprises a first plastic encased neon light electrical connection (12AA), a first plastic encased neon light first strap (12ABA), a first plastic encased neon light second strap (12ABB) and a fourth plastic encased neon light electrical connection (12DA).

Figure 3B:
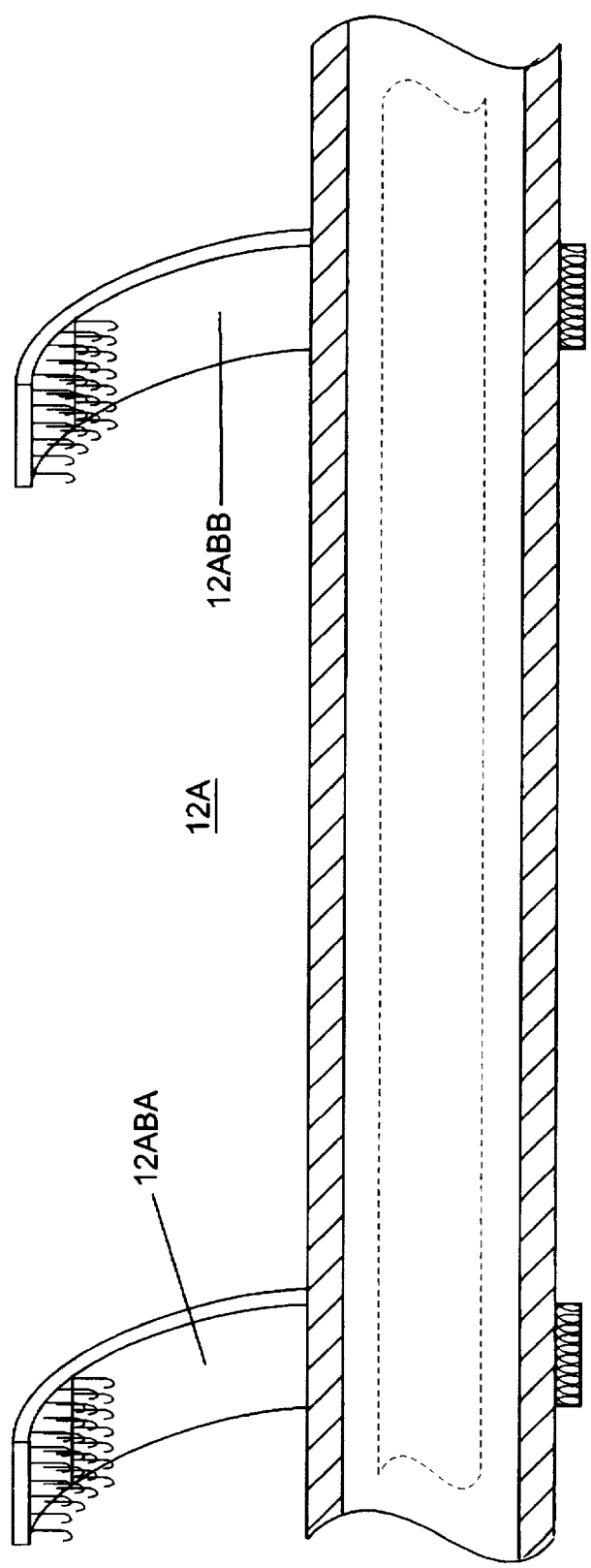
FIG. 3B is an enlarged side view of a first plastic encased neon light exhibiting a first plastic encased neon light first strap and a first plastic encased neon light second strap.

Referring to FIG. 3B which is an enlarged side view of a first plastic encased neon light exhibiting a first plastic encased neon light (12A) which comprises a first plastic encased neon light first strap (12ABA), and a first plastic encased neon light second strap (12ABB).

It will be understood that each of the elements described above, or two or more together, may also find a useful application in other types of constructions differing from the type described above.

While the invention has been illustrated and described as embodied in a portable neon lighting system, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A portable neon lighting system connectable to a bicycle, said bicycle having a horizontal cross member, first and second cross members, a front fork, and a rear fork, said system comprising:

a) a first plastic encased neon light which comprises a first electrical connection, where said first neon light is securely fastened to said horizontal cross member by a first pair of straps, said first plastic encased neon light being electrically connected to a rechargeable battery/transformer;

b) a second plastic encased neon light securely fastened to said first vertical cross member by a second pair of straps, where said second plastic encased neon light is electrically connected to said rechargeable battery/transformer by a second electrical connection; and, c) a third plastic encased neon light securely fastened to said second vertical cross member by a third pair of straps, where said third plastic encased neon light is electrically connected to said rechargeable battery/transformer via said first plastic encased neon light and a third electrical connection, where said rechargeable battery/transformer includes an ON/OFF switch electrically connected between the battery and transformer, the rechargeable battery/transformer being connected to one of said frame members by a pair of straps.

2. The portable neon lighting system as claimed in claim 1, further including a fourth plastic encased neon light securely fastened to said front fork by a fourth pair of straps, where said fourth plastic encased neon light is electrically connected to said rechargeable battery/transformer via said first plastic encased neon light and a fourth electrical connection.

* * * * *